DATA PROCESSING SYSTEM

Filed Aug. 14, 1961 4 Sheets-Sheet 1

INVENTORS
MARIUS COHN
RICHARD LINDAMAN
BY Arvin M. Haugen
ATTORNEY

DATA PROCESSING SYSTEM

Filed Aug. 14, 1961 4 Sheets-Sheet 2

INVENTORS
MARIUS COHN
RICHARD LINDAMAN
BY
ATTORNEY

July 27, 1965 M. COHN ETAL 3,197,760

DATA PROCESSING SYSTEM

Filed Aug. 14, 1961 4 Sheets-Sheet 3

INVENTORS
MARIUS COHN
RICHARD LINDAMAN
BY Orrin M. Haugen
ATTORNEY

DATA PROCESSING SYSTEM

Filed Aug. 14, 1961

INVENTORS
MARIUS COHN
RICHARD LINDAMAN
BY Orrin M. Haugen
ATTORNEY

United States Patent Office 3,197,760

Patented July 27, 1965

3,197,760

DATA PROCESSING SYSTEM

Marius Cohn and Richard Lindaman, Minneapolis, Minn., assignors to Sperry Rand Corporation, New York, N.Y., a corporation of Delaware Filed Aug. 14, 1961, Ser. No. 131,310
11 Claims. (Cl. 340—347)

The present invention is concerned generally with a data processing system and more particularly with a decoder system employing majority-decision logic and adapted to decode parallelly arranged bit words.

In the data processing field, it frequently becomes necessary to operate a decoding system in order that certain logical decisions, operations, determinations or the like may be implemented, the operating characteristics of the decoding system most pertinent to the overall system arrangement being speed and accuracy. Thus, a system which enhances either of these operating characteristics is desirable, while such a system enhancing both characteristics is deemed highly desirable. Since the advent of certain majority decision logical elements such as, for example, parametrons, transistors, tunnel diodes or the like, it is possible to combine these components into systems in which at least a portion thereof functions according to majority-decision logic. In the past, it has been generally necessary that certain Boolean techniques be employed; however, in connection with the present invention, certain stages of the apparatus have been arranged to function according to majority logic with a decrease in the number of components and a corresponding increase in operating speed and reliability.

The binary information to be decoded includes the variables A, B, C, . . . E, and their complements $\bar{A}$, $\bar{B}$, $\bar{C}$ . . . $\bar{E}$. The state of each of these variables may be conveniently represented by binary logic. The system is particularly adapted for use with a decoding network having $n$ binary bits to be decoded wherein $n$ is preferably an odd integer having a numerical value greater than 1, and preferably either 3 or 5-bit words. It is not essential that "$n$" be odd, since the system is operable with, for example, 4-bit words to be decoded.

When the parametron is being utilized as the majority-decision element, a binary "1" may be represented by a signal having a certain predetermined or arbitrarily established phase, this signal being indicative of, for example, the binary "1." A binary "1" may be selected to represent A, for example, and a binary "0" may represent $\bar{A}$. A binary "0" may be established by using a signal having a phase which is shifted for that of the binary phase, such a signal being indicative, for example, of the literal $\bar{A}$. In other words, the main or pumping frequency of the parametron is established as a binary phase, and a binary "1" is represented by a signal having an arbitrary frequency which is substantially locked with the pumping frequency, that is, the output of the resonant portion is increasing as the pumping signal is increasing. With a phase shift equal to, for example $\pi$ radians, it is possible to arbitrarily represent a binary "0" with a second signal. The transistor may be utilized as a binary majority-decision element with a certain arbitrary signal sign or level being adapted to represent a binary "1" while a signal having an opposite sign or a substantially different level being adapted to represent a binary "0." By the same technique, a tunnel diode may be utilized as a threshold device, functioning between a pair of resistance levels wherein the signal level selected may drive the tunnel diode to a state representative of either a binary "1" or a binary "0."

In the apparatus of the present invention, a pair of logical levels are utilized in order to decode "$n$" bit words or stages. In the first logic level, threshold devices are preferably employed as majority-decision elements in order to initiate processing of a first signal from the initial logical level. When 3 or 5-bit words are being decoded, a total $n-1$ majority-decision elements are normally required in the first logical level. The signal derived from the first level will then be transferred to the second logical level, the second level being arranged as a group of "AND" translators and including $2^n$ AND gates. Appropriate signals including an unconditional binary signal, a signal from the first logical level, and a signal from a bit to be decoded, are then transferred to the $2^n$ AND gates present in the second logical level or stage. The logic of the system is enhanced when complementary signals are provided. The signal from the first logical level together with the combination of the complementary signals and unconditional binary signals enable the system to expeditiously decode a plurality of randomly oriented bits utilizing only 2 stages of operation. Inasmuch as the system is adapted to function without the imposition of a group of delays or the like, the speed of operation of this system is exceedingly rapid, requiring only 1 stage of delay before the final decoding stage.

Therefore, it is an object of the present invention to provide an improved parallelly arranged decoding system employing at least one stage of majority-decision logic elements.

It is a further object of the present invention to provide an improved plural bit decoder which utilizes parallel arrangement majority-decision logic elements, the system having at least two logic levels, the first logic level being a majority decision level, the second logic level being a group of parallelly arranged "AND" elements or gates.

It is yet a further object of the present invention to provide an improved parallelly arranged decoder utilizing majority-decision logic wherein the first logic level employs elements arranged as majority-decision elements, and wherein the second level employs a plurality of AND elements, both levels being provided with at least one input which is indicative of at least one of the bits of the words to be decoded.

It is still a further object of the present invention to provide an improved parallel multi-bit decoder arrangement, the majority-decision elements being utilized in combination with means for forming complementary binary signals based upon an original binary signal.

Other and further objects of the present invention will become apparent to those skilled in the art upon a study of the following specification, appended claims and accompanying drawings wherein:

Figure 4:
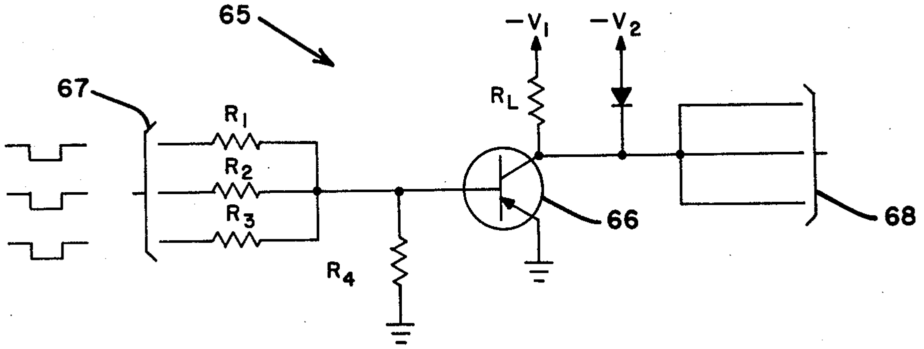
Figure 5:
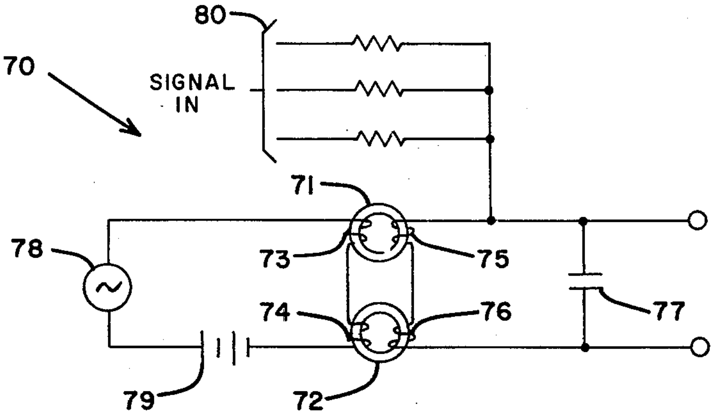
Figure 3A:
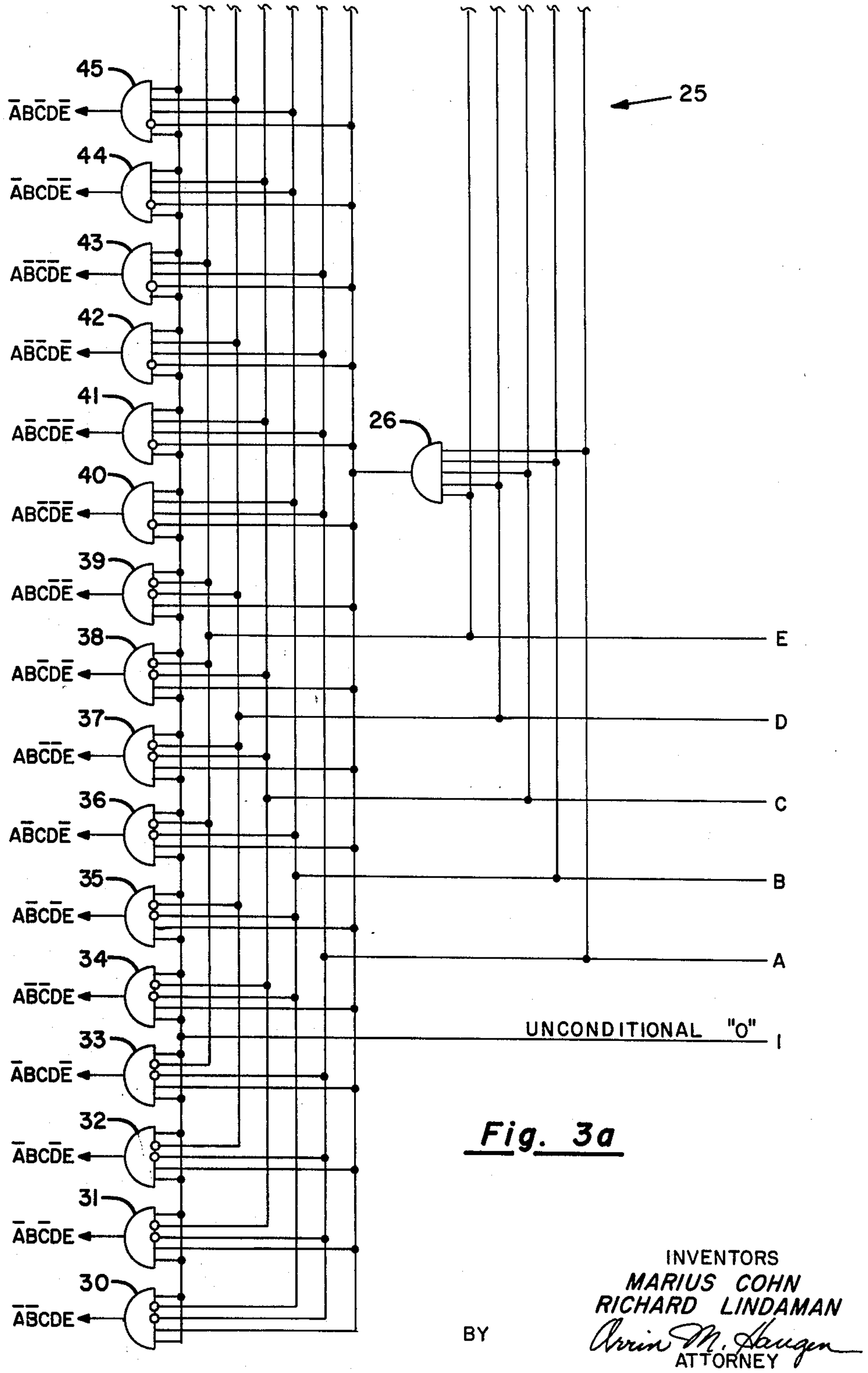

FIGS. 3A and B are a logic diagram illustrating a 5-bit parallel majority-decision decoder in accordance with the present invention;

FIG. 4 is a schematic diagram of a parametron element utilized as a majority-decision element which may be utilized with the present invention; and FIG. 5 is a schematic diagram of a transistor element and associated circuitry which may be advantageously employed as a logical majority-decision element in connection with the present invention.

Figure 1:
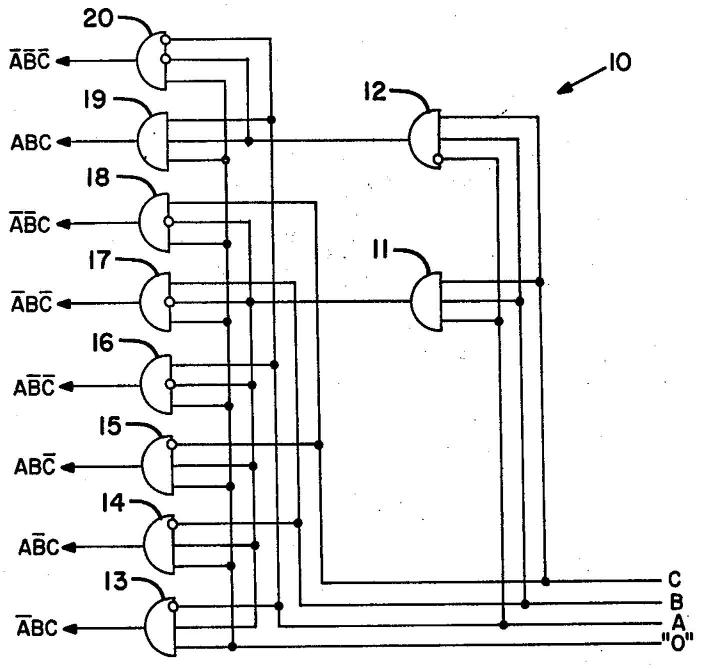
FIG. 1 is a logic diagram illustrating a 3-bit parallel majority-decision decoder.

In a preferred embodiment of the system of the present invention, a 3-bit decoder system generally designated 10 is illustrated in FIG. 1 of the drawings. This system is capable of converting or decoding binary information into decoded information, the binary system including a total of three bit stages and utilizing two levels of delay. In the system generally designated 10, the first level comprises a pair of majority-decision elements 11 and 12, the second logic level including the majority-decision elements or AND gates 13–20 inclusive. Conductive means are provided, as indicated, between appropriate signal sources and individual translating elements. The first logic level is capable of providing a signal based upon a majority function of the bits being decoded, and it is the resultant of this first logic level which is carried to certain indivdual elements in the second logic level. For example, in the first logic level, each of the majority-decision elements is provided with an input from each of the bits undergoing decoding. The input signals to one of the elements, such as the element 11, are generated by conventional pulse sources or phase controlled signal sources, these signals being received by the element 11 in their normal form. The second majority-decision element, such as the element 12, receives one of the signals, such as the signal represented by the literal A in complementary form, this signal being denoted $\overline{A}$. This complementary signal, which may be, for example, a negated signal, provides of course the equivalent of a binary "0" to the element which the actual input is in its normal or binary "1" state. A signal emanates or is generated from the element 11, this signal being representative of a binary "1," for example, when a simple majority of the three parallel inputs designated A, B and C are present and applied to 11. In other words, a binary "1" signal is received from the output of element 11 whenever a majority of the inputs are binary "1's", such as when any of the conditions AB, BC, AC or ABC exist. The element 12 is likewise capable of providing a signal indicative of that of a majority of the inputs. The output from each of these majority-decision elements is then distributed in accordance with the arrangement shown in the second logic level. In addition to the signal from the individual bits being decoded, and the signal from the majority-decision elements, an unconditional binary "0" is directed to each of the elements. Thus, while the individual elements 13–20 inclusive are essentially majority-decision elements, they are operating in the sense of an "AND" gate or element. A single "AND" is needed for each of the translating functions, a total of $2^n$ ANDS being required in each case. Thus, the binary stage of a 3-bit decoder requires 8 "AND" units. The individual output signals are represented along the individual output lines, a signal being generated or permitted to pass through the elements whenever a specific condition has been found to exist, this condition being represented by appropriate designations in the output portion of the individual "AND" translators.

Regarding further requirements for the various logic levels, when $n$ bits are present and require decoding, the first logic level includes $n-1$ majority-decision elements. One of these majority-decision elements is provided with a normal input from each of the bits while the second majority-decision element has one of the inputs directed thereto in complementary form. When more than 3 bits are being decoded, a greater number of majority-decision elements will be required in the first logic-level. In this connection, additional complementary signals will be received by the remaining elements in the first logic level. Accordingly, when the first logic level includes $n-1$ elements, only one of these is provided with each of the signals being directed thereto in normal form. The remaining majority-decision elements have one or more of these signals in complementary form. In certain instances more than one signal is directed in complementary form to elements in the first logic level.

The application of signals to the "AND" elements in the second logic level are straightforward and do not require a specific illustration here. It is believed sufficient to say that the "AND" elements are provided with inputs from each of the bits in accordance with equations set forth hereinafter.

The character "#" as used herein identifies the phrase "Majority of," such as, for example, the designation A#B#C holding for a majority of the literals separated by the #, such as any of the combinations AB, BC, AC or ABC. Therefore, with the appropriate inputs it is possible to provide a first logic level utilizing majority-decision logic and a second logic level employing "AND" logic to successfully provide a decoder system which is accurate and rapid in its operation, and which utilizes a minimum of components. With only two stages of delay being utilized the output is, of course, more rapid than would be possible with a greater number of stages.

Figure 2:
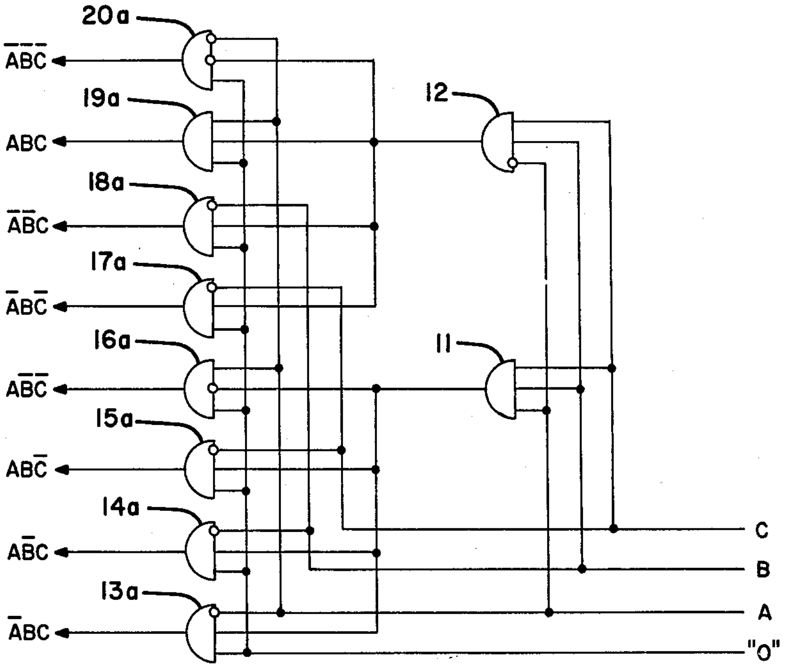
FIG. 2 is a logic diagram illustrating a 3-bit parallel majority-decision decoder somewhat modified from that system illustrated in FIG. 1.

Reference is made to FIG. 2 of the drawings for an alternative form of decoder, the advantage in this system generally designated 21 being the equal fan-out design. Thus, when power dissipation in any component in the system is a problem, a fan-out from each element in the first logic level to an equal number of elements in the second logic level is utilized.

Figure 3B:
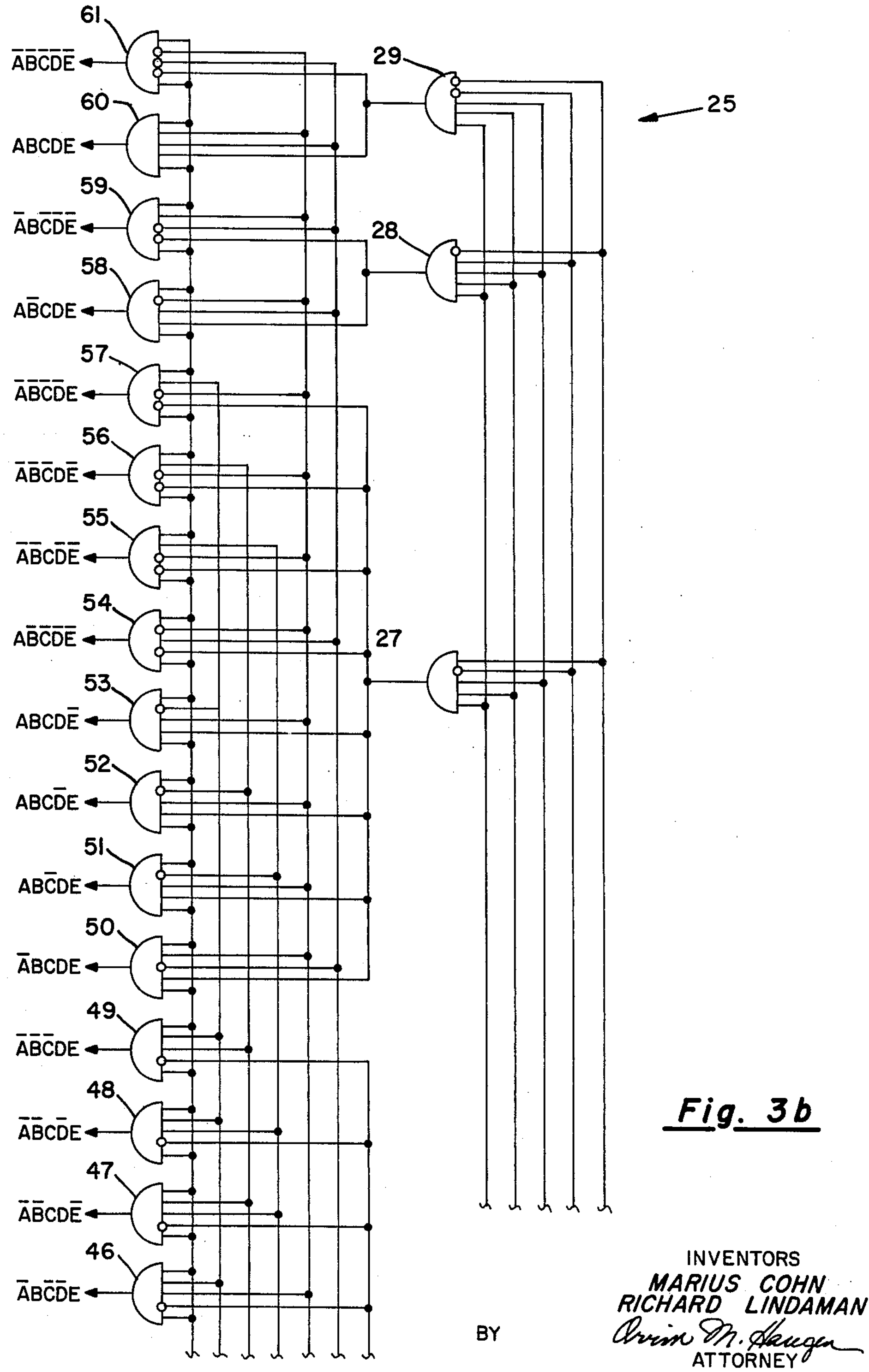

Reference is made to FIG. 3 of the drawings wherein a system providing for a 5-bit decoder is shown. Since the individual components are identical, certain reference numerals have been duplicated. This decoding network generally designated 25 has a pair of logic levels in which the first logic level includes the majority-decision elements 26, 27, 28 and 29. The inputs to the majority-decision element 26 are all in the normal or non-complementary state while the inputs to the majority elements 27, 28 and 29 include certain complementary signals. One of the inputs, such as the input designated "B" is applied to the element 27 in complementary or inverted form, this meaning that the element receives a "0" signal when the input "B" is indicative of $\overline{B}$. On the other hand, the input $\overline{B}$ will be designated as a positive signal to the element 27. A second input, for example input A, is given in complementary form to the second majority logic element 28, the various aspects of this input being, of course, similar to that given in connection with the signal negation in element 27. Both inputs previously negated, A and B, are applied in complementary form to the majority-decision element 29. The individual output of the first logic level is applied to a plurality of AND elements 30–61 inclusive. The elements 30–61 inclusive are AND elements, each element being adapted to receive a pair of unconditional binary "0" signals along with 3 remaining signals which correspond to certain of the bit stages or variables being determined.

The basic logic equation pertaining to the majority-decision logic utilized in this system may be written using the following:

(1) $$A \# B \# C = AB + AC + BC$$

One of the theorems which has been developed in the majority-decision logic is identified as follows:

(2) $$\overline{W} \# (W \# X \# Y) \# Z = Y \# (\overline{W} \# X \# Z) \# Z$$

(3) $$= \overline{W} \# (X \# Y \# Z) \# Z$$

A consideration of the above expressions provides a reliable and rapid operating majority-decision 3-bit decoder circuit. A 3-bit decoder utilizing binary majority-decision elements would require a total of 12 majority-decision elements, if designed conventionally, however, theorems (2) and (3) may be utilized to provide a design which requires only 10 elements. Specifically, theorem (2) (with $Z=0$) followed by application of (1) with $Z=0$ gives (4):

(4) $$(A \# B \# C) \# \overline{A} \# 0 = \overline{A}\ B\ C$$
$$(A \# B \# C) \# \overline{B} \# 0 = A\ \overline{B}\ C$$
$$(A \# B \# C) \# \overline{C} \# 0 = A\ B\ \overline{C}$$

Substitutions of (4) gives:

$$(\overline{A} \# \overline{B} \# \overline{C}) \# A \# 0 = A\ \overline{B}\ \overline{C}$$
$$(\overline{A} \# \overline{B} \# \overline{C}) \# B \# 0 = \overline{A}\ B\ \overline{C}$$
$$(\overline{A} \# \overline{B} \# \overline{C}) \# C \# 0 = \overline{A}\ \overline{B}\ C$$
$$(\overline{A} \# B \# C) \# A \# 0 = A\ B\ C$$
$$(A \# \overline{B} \# \overline{C}) \# \overline{A} \# 0 = \overline{A}\ \overline{B}\ \overline{C}$$

The equations given hereinabove are representative of a 3-bit parallel decoder. An analogous pentadic expression may be set forth from (4) hereinabove:

$$(5)\qquad \bar{V}\cdot\bar{W}\cdot\ (V\#W\#X\#Y\#Z)=\bar{V}\cdot\bar{W}\cdot X\cdot Y\cdot Z$$

If P, Q, R, and S are defined by $$P=A\#B\#C\#D\#E$$
$$Q=A\#\bar{B}\#C\#D\#E$$
$$R=\bar{A}\#B\#C\#D\#E$$
$$S=\bar{A}\#\bar{B}\#C\#D\#E$$

substitutions in (5) yield $$\bar{A}\bar{B}P=\bar{A}\bar{B}CDE$$
$$\bar{A}\bar{C}P=\bar{A}B\bar{C}DE$$
$$\bar{A}\bar{D}P=\bar{A}BC\bar{D}E$$
$$\bar{A}\bar{E}P=\bar{A}BCD\bar{E}$$
$$\bar{B}\bar{C}P=A\bar{B}\bar{C}DE$$
$$\bar{B}\bar{D}P=A\bar{B}C\bar{D}E$$
$$\bar{B}\bar{E}P=A\bar{B}CD\bar{E}$$
$$\bar{C}\bar{D}P=AB\bar{C}\bar{D}E$$
$$\bar{C}\bar{E}P=AB\bar{C}D\bar{E}$$
$$\bar{D}\bar{E}P=ABC\bar{D}\bar{E}$$
$$AB\bar{P}=AB\bar{C}\bar{D}\bar{E}$$
$$AC\bar{P}=A\bar{B}C\bar{D}\bar{E}$$
$$AD\bar{P}=A\bar{B}\bar{C}D\bar{E}$$
$$AE\bar{P}=A\bar{B}\bar{C}\bar{D}E$$
$$BC\bar{P}=\bar{A}BC\bar{D}\bar{E}$$
$$BD\bar{P}=\bar{A}B\bar{C}D\bar{E}$$
$$BE\bar{P}=\bar{A}B\bar{C}\bar{D}E$$
$$CD\bar{P}=\bar{A}\bar{B}CD\bar{E}$$
$$CE\bar{P}=\bar{A}\bar{B}C\bar{D}E$$
$$DE\bar{P}=\bar{A}\bar{B}\bar{C}DE$$
$$\bar{A}BQ=\bar{A}BCDE$$
$$\bar{C}BQ=AB\bar{C}DE$$
$$\bar{D}BQ=ABC\bar{D}E$$
$$\bar{E}BQ=ABCD\bar{E}$$
$$A\bar{B}\bar{Q}=A\bar{B}\bar{Q}-A\bar{B}\bar{C}\bar{D}\bar{E}$$
$$C\bar{B}\bar{Q}=\bar{A}\bar{B}C\bar{D}\bar{E}$$
$$D\bar{B}\bar{Q}=\bar{A}\bar{B}\bar{C}D\bar{E}$$
$$E\bar{B}\bar{Q}=\bar{A}\bar{B}\bar{C}\bar{D}E$$
$$A\bar{B}R=A\bar{B}CDE$$
$$\bar{A}\bar{B}\bar{R}=\bar{A}\bar{B}\bar{C}\bar{D}\bar{E}$$
$$ABS=ABCDE$$
$$\overline{ABS}=\bar{A}\bar{B}\bar{C}\bar{D}\bar{E}$$

The above set of equations describes a five-bit parallel decoder consisting of only 36 pentadic majority decision elements. The corresponding diagram is shown in FIG. 3.

Referring now to the transistor controlled majority-decision circuit described in FIG. 5, it will be observed that the system generally designated 50 includes a transistor 51 having a plurality of inputs at 52 and having an output group at 53. A germanium clamping diode is provided in the output in order to control the magnitude of the output, independent of the number of active inputs. The majority element utilizes a negative pulse signal as representative of a binary "1," with a ground input being representative of a binary "0." Since the output from this system is inverted from the input, a suitable additional inverter may be employed if inversion is not desired. In the operation, an input pulse is applied at the input 52, one input being insufficient in magnitude to cause transistor 51 to conduct. The magnitude of two or more pulses are, on the other hand, capable of starting the transistor into conduction, this, in turn, being represented by an inverted pulse occurring in the output so long as the majority of binary "1's" are being represented at the input. Regarding orders of magnitude, the value of $V_1$ is in the range of about −4 volts, $V_2$ is in the range of about −2 volts, and $V_3$ is of the order of −4 volts. For proper operation, it is essential that $V_2$ be lower in magnitude than $V_1$. The input resistors R1, R2 and R3 are preferably in the range of about 500 ohms, R4 is preferably about 50 ohms and $R_L$ is preferably about 400 ohms. This circuitry arrangement is suitable for performing appropriate majority-decision logic determinations.

In the parametron circuit, the system is capable of indicating conditions in terms of resonance phenomena. In this connection, when the resonance frequency of a resonator is subjected to a variation by associating the resonator with a current having frequency $2f$ which is substantially equal to twice the resonance frequency of the resonator, a ½ subharmonic oscillation having a frequency $f$ is induced in the resonator.

Applying this arrangement to a majority-decision system, a binary "1" will be represented in the phase of the output only when a majority of the substantially matched input signals represent a binary "1." In this apparatus two or more of the input signals must represent a binary "1" in order to have the output to be so constituted. In the same fashion, a signal representing a binary "0" will occur in the output only when a majority of the input signals to the parametron network represent a binary "0." This apparatus is readily adaptable for installation in a system such as is illustrated in FIGS. 1, 2 and 3.

Referring to FIG. 4 of the drawing, a parametric oscillator, generally designated 70 is shown, the system including a pair of laminated or ferrite cores 71 and 72. Windings 73, 74, 75 and 76 are provided as illustrated in the drawing. Windings 73 and 74 are in series and in phase, while coils 75 and 76 are counter-wound and accordingly provide signals to the cores which are out of phase. Windings 75 and 76 along with a capacitor 77 comprise a resonant circuit having a normal resonant circuit frequency $f$. Since windings 75 and 76 are arranged in counter-phase relationship, a system balance is maintained which avoids direct coupling of the initial excited current to the resonance current. A source of excitation current 78 having a normal frequency $2f$, and a direct current source such as the battery 79 is provided in order to operate the cores 71 and 72 at a point of permeability which provides a maximum variation of the magnetization of the cores relative to the level of the excitation current source. When the excitation current at frequency $2f$ is supplied to the windings 73 and 74, the resonant circuit including windings 75 and 76 along with capacitor 77 oscillates in a subharmonic frequency of the order of one-half of the excitation frequency, this frequency being conveniently designated $f$. The initial oscillation which is provided by the excitation current source 78 and direct current source 79 is of relatively low intensity. The sources 78 and 79 provide what is commonly termed the "pumping current" to the parametron network. One or more signal sources are provided at 80, each of these having a frequency $2f$, and being arranged to be connected to the resonant circuit. When the signal source is energized, the amplitude of current in the resonant circuit increases rapidly until an upper limit is reached, and from this point on the oscillation is maintained at a stable level. The phase of the oscillation occurring in the resonant circuit is either at a certain given phase representative of a binary "1" or at a phase which is shifted by $\pi$ radians, this phase representing a binary "0." The phases of oscillation cannot be other than one or the other. It will be appreciated, of course, that a single core parametron may be suitably utilized in place of the dual core network shown and described herein. Thin film cores may also be advantageously employed.

It is understood that suitable modifications may be made in the structure as disclosed provided such modifications come within the spirit and scope of the appended claims. Having now, therefore fully described and illustrated our invention, what we claim to be new and desire to protect by Letters Patent is:

What is claimed is:

1. A data processing system comprising a plurality of majority-decision translating elements responsive to a majority of the input signals coupled thereto and providing an output indicative of said majority, said system including a plurality of signal sources representing multi-bit words to be decoded, the number of bits being equal to an integer having a value greater than 1, a binary input representing each word to be decoded and an unconditional input, first and second logic levels, said first logic level having a plurality of majority-decision logic elements, means for providing a first majority-decision element in said first logic level with an input consisting of each bit of the word to be decoded, and means for providing at least one additional majority-decision element in said first logic level with an input consisting of each bit of the word to be decoded, at least one input bit to said additional majority decision element being in complementary form, and means for transmitting the output of said first logic level to the elements in said second logic level, said second logic level comprising a plurality of AND elements, each element therein being arranged to receive a plurality of inputs including an output signal from a majority-decision element in said first logic level and at least one signal representative of the bit of the word to be decoded.

2. The data processing system as defined in claim 1 being particularly characterized in that each of the outputs from the logic elements in said first level is coupled to a substantially equal number of logic elements in said second level.

3. A data processing system comprising a plurality of majority-decision translating elements responsive to a majority of the input signals coupled thereto and providing an output indicative of said majority, said system including at least 3 bits of the word to be decoded, a binary input from each bit and an unconditional input, a first and a second logic level, said first logic level having a plurality of logic majority-decision elements, means for providing a first majority-decision element in said first logic level with an input thereto consisting of each bit of the word to be decoded, and means for providing a second majority-decision element in said first logic level with an input consisting of each bit of said word to be decoded, at least one input bit to said second majority-decision element being in complementary form, and means for coupling the output of said first logic level to the elements in said second logic level, said second logic level comprising a plurality of AND elements, each element therein being arranged to receive a plurality of inputs including an output signal from a majority-decision element in said first logic level, and at least one binary bit to be decoded.

4. The data processing system of claim 3 being particularly characterized in that each of said AND elements is a triadic majority-decision element, and in that at least one unconditional input is applied to each of said AND elements.

5. A data processing system comprising a plurality of majority-decision translating elements responsive to a majority of the input signals coupled thereto and providing an output indicative of said majority, said system including at least 3 and up to 5 binary bits of a word to be decoded, a binary input from each bit and an unconditional input, a first and a second logic level, said first logic level having at least two logic majority-decision elements, means for providing a first majority-decision element in said first logic level with an input thereto consisting of each bit representative of the word to be decoded, and means for providing additional majority-decision elements in said first logic level with an input from each bit representative of the word to be decoded, at least one input to each of said additional elements being in complementary form, and means for transmitting the output of said first logic level elements to the logic elements in said second level, said second logic level comprising a plurality of AND elements, each element therein being arranged to receive a plurality of inputs including an output signal from a majority-decision element in said first logic level, and at least one binary bit to be decoded.

6. The data processing system of claim 5 being in that each of said AND elements is a majority-decision element, and in that at least one unconditional input is applied to each of said AND elements.

7. A data processing system comprising a plurality of majority-decision translating elements responsive to a majority of the input signals coupled thereto and providing an output indicative of said majority, said system including a first and a second logic level and signal synchronizing means for each of said levels, the translating elements in said first level being arranged to determine the majority of signals from a plurality of bit sources and including a first together with a plurality of second majority-decision elements, means for providing the first majority-decision element in said first logic level with a normal signal from each bit, and means for providing the second majority-decision elements in said first logic level with a signal from each bit, at least one of said input signals to said second-majority decision elements being complementary, said second logic level comprising a plurality of AND majority-decision gates and means for driving said AND gates with a family of synchronized signals selected from the output of said first logic level, at least one of said bit signals, and at least one unconditional complementary signal.

8. A data processing system comprising a plurality of majority-decision translating elements responsive to a majority of the input signals coupled thereto and providing an output indicative of said majority, said system including a first and a second logic level arranged to determine the majority of signals from a plurality of bit sources and including a first and at least one second majority-decision element the first element being provided with means to apply a normal signal thereto consisting of each bit to be decoded, and wherein means are provided to couple a signal from each bit to each of said second majority-decision elements, at least one certain bit forming the input signals to said second majority-decision elements being in complementary form, a second logic level including a plurality of AND majority-decision gates, and means for driving said AND gates with a family of simultaneously applied signals selected from the output of said first logic level, at least one of said bit signals and at least one unconditional complementary signal.

9. A data processing system comprising a plurality of majority-decision translating elements responsive to a majority of the input signals coupled thereto and providing an output indicative of said majority, said system including a first and a second logic level arranged to determine the binary value of the majority of signals which are coupled thereto, said first logic level including a first and a second triadic majority-decision element wherein means are provided for coupling a normal signal representing each bit of the word to be decoded to said first element and wherein means are provided for coupling a signal to said second element representing each bit of the word to be decoded, one of said input bit signals to said second majority-decision element being in complementary form, and means for driving a plurality of AND majority-decision gates with a group of synchronized signals, each group including a first signal selected from the output of said first logic level, a second signal selected from one of said bit signals, and a third signal from said unconditional complementary signal source.

10. A data processing system comprising a plurality of majority-decision translating elements responsive to a majority of the input signals directed thereto and providing an output indicative of said majority, said system including three binary inputs to be decoded A, B, C, $\overline{A}$, $\overline{B}$ and $\overline{C}$, an unconditional input, and means for forming a complementary signal for each of said input bits, a first and a second logic level, said first logic level having two majority-decision elments wherein the first of said elements is coupled to a binary input representing each bit of the word to be decoded, and wherein the second majority-decision element is coupled to a binary input representing each bit, at least one of which is in complementary form, and means for transmitting the output of each element in said first logic level to four elements in said second logic level, said second logic level comprising eight AND elements, each element in said second logic level receiving a plurality of inputs including a first signal selected from an output of an element in said first logic level, a second signal selected from one of said binary bit signals, and a third signal from said unconditional signal source.

11. A data processing system comprising a plurality of majority-decision translating elements responsive to a majority of the input signals directed thereto and providing an output indicative of said majority, said system having "n" binary bits to be decoded wherein "n" is a positive integer having numerical value greater than 1, a first and a second logic level, said first logic level comprising a plurality of majority-decision elements wherein means are provided to couple one input from each bit to each of said first level elements, each of the inputs to a first element being normal and at least one input bit to said second elements being complementary, means for coupling the output from said first logic level to the elements in said second logic level, said second logic level comprising a plurality of AND elements, each AND element therein receiving a plurality of inputs including at least one unconditional input, at least one signal taken from the output of a majority-decision element in said first logic level, and at least one binary bit of the word to be decoded.

References Cited by the Examiner

UNITED STATES PATENTS

| | | | |
|---|---|---|---|
| 2,754,450 | 7/56 | Bland | 235—155 X |
| 2,999,637 | 9/61 | Curry | 235—175 |

MALCOLM A. MORRISON, *Primary Examiner.*